US007810154B2

United States Patent
Hum et al.

(10) Patent No.: US 7,810,154 B2
(45) Date of Patent: Oct. 5, 2010

(54) SYSTEM AND METHOD FOR DETECTION AND LOCATION OF ROGUE WIRELESS ACCESS USERS IN A COMPUTER NETWORK

(75) Inventors: Gau Wei Hum, Singapore (SG); Siew Leong Kan, Singapore (SG)

(73) Assignee: Nanyang Polytechnic, Singapore (SG)

( * ) Notice: Subject to any disclaimer, the term of this patent is extended or adjusted under 35 U.S.C. 154(b) by 817 days.

(21) Appl. No.: 10/564,738

(22) PCT Filed: Aug. 23, 2004

(86) PCT No.: PCT/SG2004/000255

§ 371 (c)(1),
(2), (4) Date: Jan. 19, 2006

(87) PCT Pub. No.: WO2005/041040

PCT Pub. Date: May 6, 2005

(65) Prior Publication Data

US 2008/0052763 A1 Feb. 28, 2008

(30) Foreign Application Priority Data

Oct. 23, 2003 (SG) .............................. 200306322-9

(51) Int. Cl.
*G06F 21/00* (2006.01)
(52) U.S. Cl. ..................... 726/22; 380/258; 380/270
(58) Field of Classification Search ..................... 726/6, 726/17, 26; 713/155; 380/258, 270
See application file for complete search history.

(56) References Cited

U.S. PATENT DOCUMENTS

2003/0023412 A1 * 1/2003 Rappaport et al. ............. 703/1
2003/0045270 A1 * 3/2003 Agrawal et al. ............. 455/410

FOREIGN PATENT DOCUMENTS

WO  WO-03/083601 A2 * 10/2003

* cited by examiner

*Primary Examiner*—Gilberto Barron, Jr.
*Assistant Examiner*—Simon Kanaan
(74) *Attorney, Agent, or Firm*—Pyprus Pte Ltd

(57) ABSTRACT

A system and method to detect and geographically locate rogue wireless access users to a computer network are described. The present invention maps an area covered by the wireless network into islands with substantially similar network performances based on information collected by a network management system. This information is collected throughout the day to form a spatial performance model which comprises historical records of each island, giving a dynamic picture of the area covered. The averages of these historical values of the performance parameters at each time interval of the day form the basis of comparison with the captured current values of the rogue user. Once a potential intruder has been identified from his Media Access Control and Internet Protocol addresses, the algorithm of the present invention is used to localize the suspect into the island which has the substantially similar performance characteristics as the rogue user's computer.

21 Claims, 4 Drawing Sheets

SYSTEM AND METHOD FOR DETECTION AND LOCATION OF ROGUE WIRELESS ACCESS USERS IN A COMPUTER NETWORK

FIELD OF THE INVENTION

The present invention relates to methods to computer networks.

In particular, this invention relates to a method to detect and locate a rogue wireless access user to a computer network.

BACKGROUND OF THE INVENTION

Wireless computer networks have grown in recent years not only for business enterprise environments but also for the small office/home office, universities and even cafes. The wireless local area networks (WLAN) make it very convenient for users to access information in a computer network, whether for work or recreation.

A WLAN makes use of wireless access points (AP) to send and receive signals to connect computers wirelessly to a central computer or server. Organizations provide WLANs to facilitate their employees, business partners, students or customers to access their servers.

However, unlike a wired local area network (LAN) where access means that a user's computer has to be physically connected to a network socket via a wire or cable, access to wireless LANs only require a user to have a wireless access card on his computer for access to the network.

This wireless access card may also be present as an in-built capability in computers and other wireless computing devices such as personal digital assistants (PDAs), tablet computers, mobile telephones and combination devices with features of these wireless computing devices.

In a WLAN deployment, while servers and access points have native security measures, these may not be sufficiently or properly enabled due to ignorance, or are intentionally circumvented by users who desire faster access to the network.

Numerous methods and devices to restrict access to a WLAN to authorized users only abound. However, when an unauthorized or rogue user is detected, existing methods and devices of the prior art are not able to detect the geographical location of these rogue users.

To detect rogue users, the techniques of the prior art may use a wireless monitoring device that stores Media Access Control (MAC) addresses of users to compare the device number of each access point used against a list of authorized APs. This information may be correlated to Received Signal Strength Indicator values so as to give an idea of the distance the rogue user is from an AP of the network. However, determining and geographically locating the AP in question more precisely is not possible with the methods of the prior art.

To locate any rogue users in the network, a person has to use another device, a customized receiver with a directional antenna. This device is brought to the area where the rogue user is suspected to be in, to "home in" on his signals. Such a device may be couple to a Global Positioning System device as is taught by WO02/089507 (Younis).

Another invention uses a time acquisition unit to determine the distance of a mobile terminal from an AP (WO03/046600, Dietrich and Kraemer). Yet another invention (US2003023876, Bardsley), correlates network and intrusion information to find the physical connection port into the protected device rather than the geographical location of the rogue user.

However, all these inventions cannot detect and locate the rogue user without having to physically be on the ground, in the area covered by the WLAN. As such, these methods of the prior art are limited by requiring a human to physically patrol the area with a receiver to locate rogue users. Therefore, a method of detecting and determining the geographical location of unauthorized or rogue access users without having to be physically on the ground, will add an extra layer of protection to critical network resources without having to incur high costs, especially in human resources. Such an invention will be welcome to address this deficiency in the prior art.

SUMMARY OF THE INVENTION

The present invention seeks to provide a system and method against unauthorized, rogue users of a computer system.

Accordingly, in one aspect, the present invention provides a method to detect and geographically locate a rogue user wirelessly accessing a computer network, the method comprising:

deploying at least one Network Management System program;

mapping a geographical area covered by the wireless computer network into at least one island;

measuring at least one network performance parameter for each island to obtain a spatial performance model;

deriving a performance index for each island based on the at least one performance parameter;

identifying a potential rogue user based at least on his Media Access Control (MAC) address and Internet Protocol (IP) address;

measuring at least one performance parameter of the potential rogue user;

deriving at least one performance index for the potential rogue user;

determining location of the potential rogue user by comparing the performance index of the potential rogue user with historical, average performance indices of each island pertinent to the current time of detection; and effecting at least one network security measure against the rogue user.

In another aspect, the present invention provides a system to detect and geographically locate a rogue user wirelessly accessing a computer network, the system comprising:

a computer network with at least one wireless access point, at least one processor, at least a network management system, at least one storage means, and at least one implementation of the algorithm of the present invention, wherein the rogue user is able to be geographically located without having the computer network's user having to be physically in the vicinity of the rogue user.

BRIEF DESCRIPTION OF THE DRAWINGS

A preferred embodiment of the present invention will now be more fully described, by way of example, with reference to the drawings of which.

DETAILED DESCRIPTION OF THE DRAWINGS

The invention will now be described. In the following description, details are provided to describe the preferred embodiment. It shall be apparent to one skilled in the art, however, that the invention may be practiced without such details. Some of these details may not be described at length so as not to obscure the invention.

There are many advantages of the preferred embodiment of the invention. The advantages of the preferred embodiment include allowing the network administrators using the invention to monitor, detect and locate rogue users speedily in the wireless networks without leaving his desk. When a rogue user is detected, security measures may be taken against him. When repeat offenders are located after being warned, they may be prosecuted according to the applicable laws of the country concerned.

The present invention provides a method and a system using network performance information to detect and geographically locate rogue users in a wireless computer network.

Figure 1:
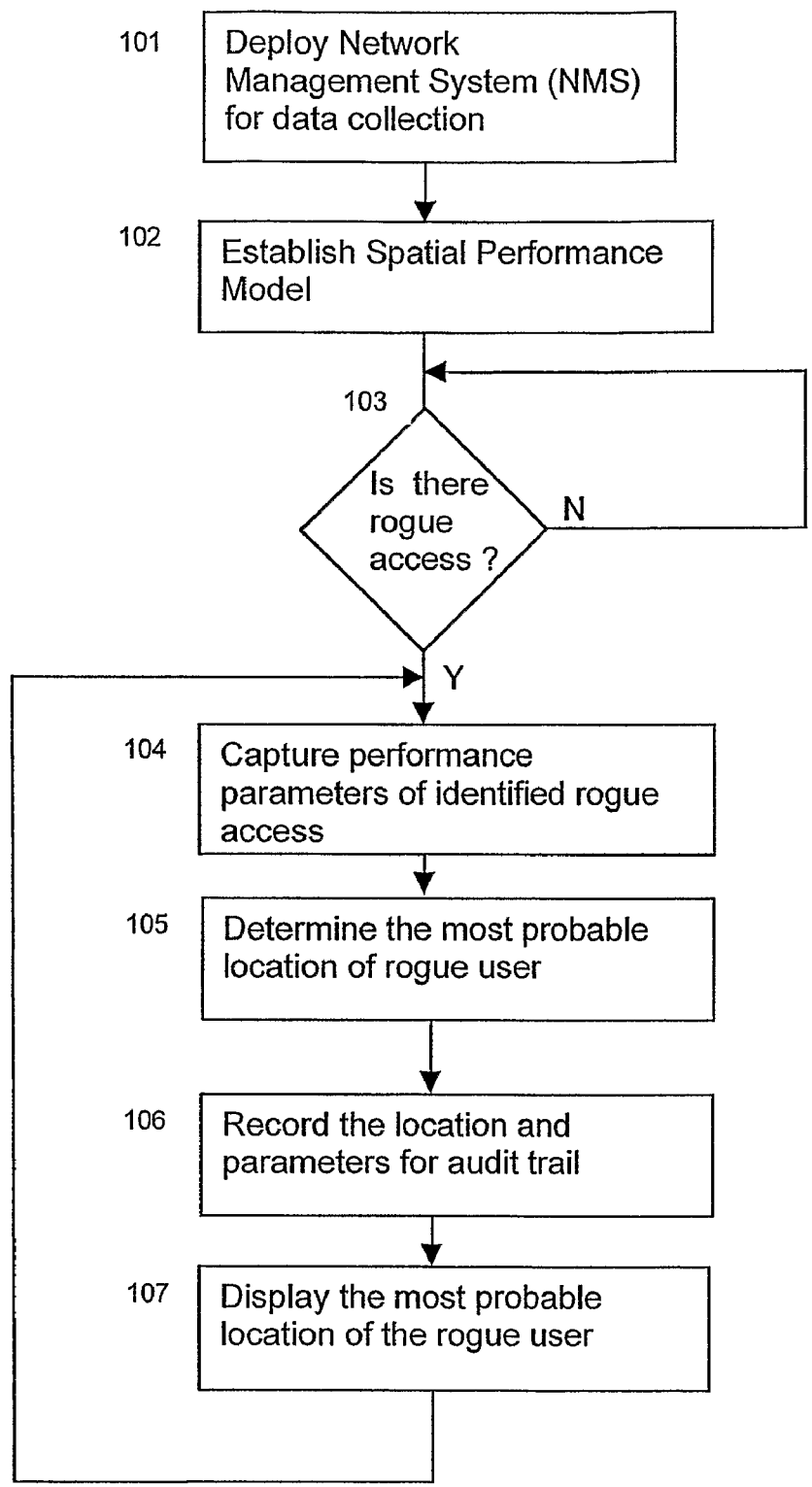
FIG. 1 is the overall flowchart of how the present invention works.

The overall strategy of the present invention is illustrated in FIG. 1. First, a commercially-available Network Management System (NMS) is deployed 101 to establish the spatial performance model 102 for a WLAN. This is done by collecting and mapping out the performance characteristics of wireless computers in various spots or islands, identified by their respective position indices (eg 1, 2, 3, 4, 5, etc in FIG. 2), in the area covered by the wireless access points (APs) of that network. This area is typically in buildings and the surrounding areas where genuine, authorized users may log on wirelessly into the network, and where rogue users may intermingle and hide in plain sight while connecting to the WLAN. Also of interest will be hidden areas such as blind corners and stairwells where rogue users may favour.

The mapping may be ad hoc, that is, as and when users log on in various known, pre-identified, areas for wireless access such as a dedicated lounge for "hot desking" workers or university cafeteria with APs for students. Alternatively, the mapping may be systematic, that is, a member of the information technology office staff may position himself at each pre-identified or predetermined island or spot, log on wirelessly with a computer or a suitable wireless computing device, and allow the performance characteristic of his computer or device to be captured for each spot or island.

Thereafter, the performance characteristic of each spot or island (as identified by their respective position index) may continually be captured and monitored at fixed intervals throughout the day. As such, this information is dynamically updated at these time intervals by the deployed Network Management System (NMS) used by the network. Under the present invention, the performance characteristic of each spot is the aggregate of the measured values of various network performance parameters for that spot or island. As the performance of the wireless network changes through the day depending on the number of users accessing the system, these spots or islands may also be dynamically changed and updated, grouped according to substantially similar performance characteristics at each particular point in time.

The idea is, when a suspected rogue user is detected 103 based on his Media Access Control (MAC) and Internet Protocol (IP) addresses, an algorithm, an element of the present invention, may be used to locate him using the performance characteristic 104 of his computer at a spot which has been mapped to position indices 105 in the surrounding area.

A variety of security measures may then be taken, ranging from merely logging his particulars in an audit trail 106 or displaying his most probable location 107, to preferentially denying him access the next time, to prosecuting him according the prevailing laws of that jurisdiction.

Thus, the spatial performance model of the present invention links the performance characteristic of each island with their location. In other words, the spatial performance model is used to identify the location of a rogue user by his computer's network performance characteristics.

To establish the spatial performance model for a particular WLAN, any suitable, commercially available NMS software may be deployed (101, FIG. 1) and used. These programs are able to collect and show the MAC and IP addresses of computers and access points logged into the network as well as other performance characteristics of each wireless connection to the network.

Each "layer" of the network system has performance parameters whose values varies in accordance with the following variables such as distance from access point, number of wireless users, network topology, building materials used, and time of day. These performance parameters may be used for the determination of geographical location of rogue user.

With reference to the Open System Interconnection (OSI) reference model for data communications, at the physical layer, the signal strength and signal-to-noise ratio may be used. At the network layer, "ping" response time and propagation delay times may be used. At the application layer level, the transaction response and delay times may be used. At the data link layer, the link utilization, packet rate, number of error packets and throughput rate may be used as performance parameters. These parameters are merely examples of measurements that may be used and the present invention is of course not limited to use of only these parameters.

Now, as the distance of a user's computer from a wireless access point (AP) increases, the network performance pertaining to that user's computer decreases. Deterioration in network performance is also affected by building structures that reduce the transmission strength of the signals.

Figure 2:
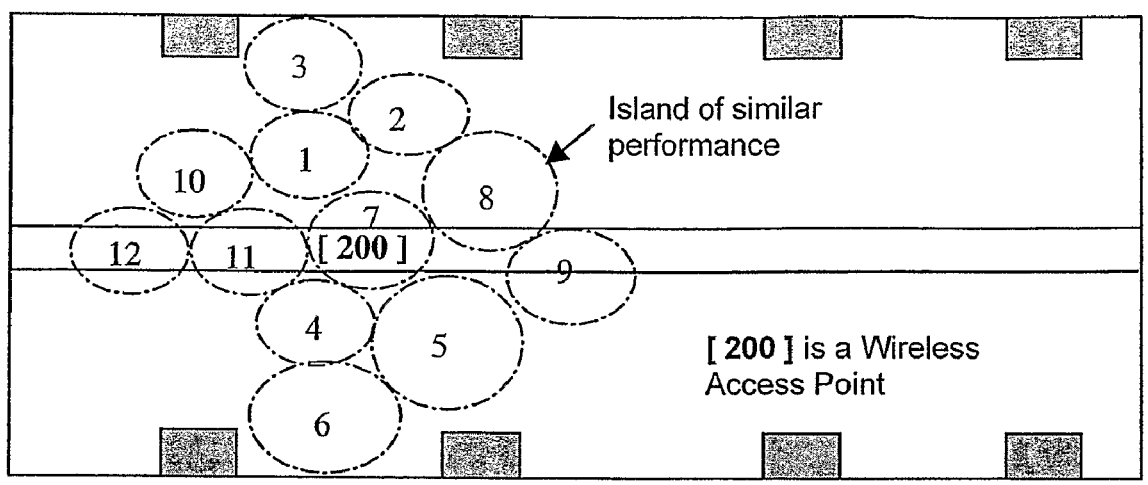
FIG. 2 shows the islands around a wireless access point with similar network performance characteristics.
Figure 3:
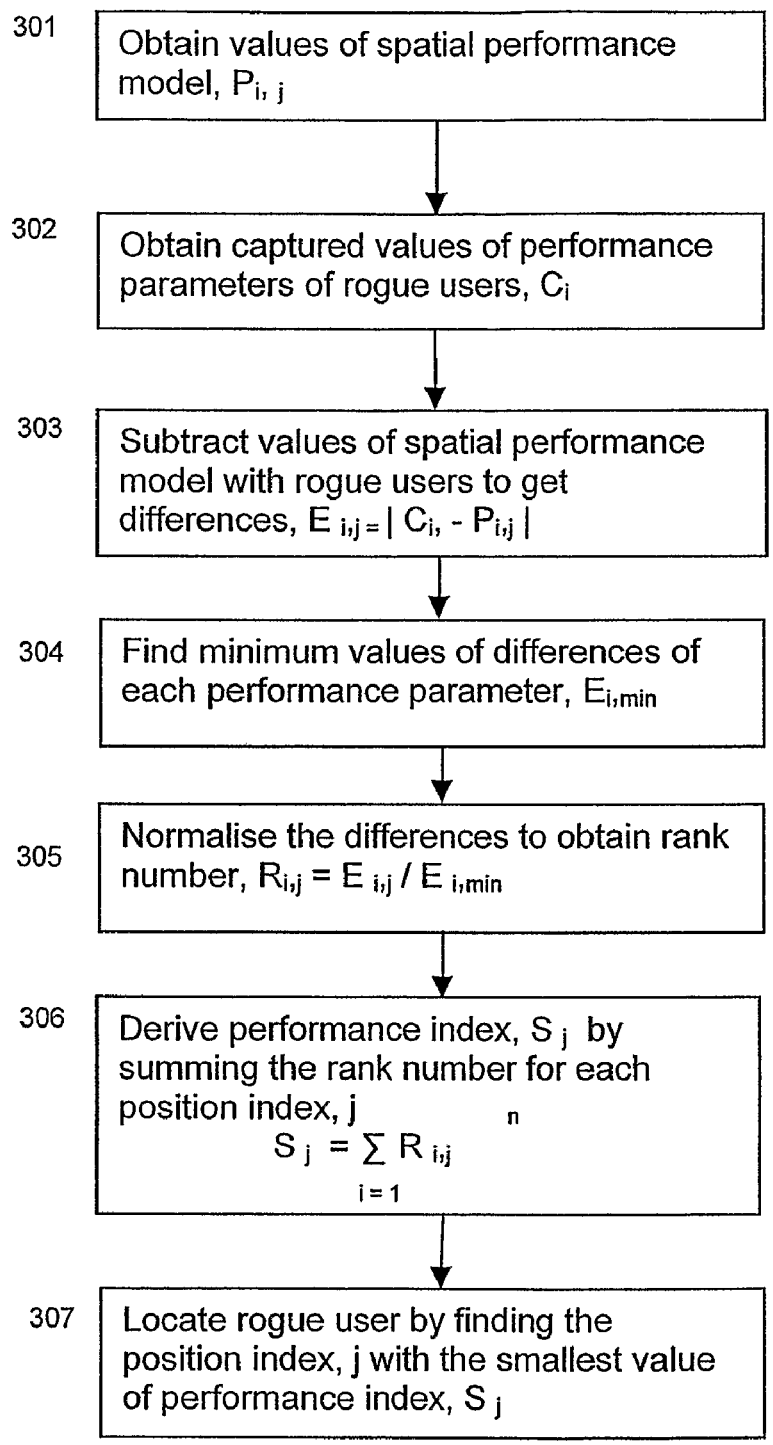
FIG. 3 is a more detailed flowchart showing how the algorithm of the present invention works in one embodiment of the invention.
Figure 4:
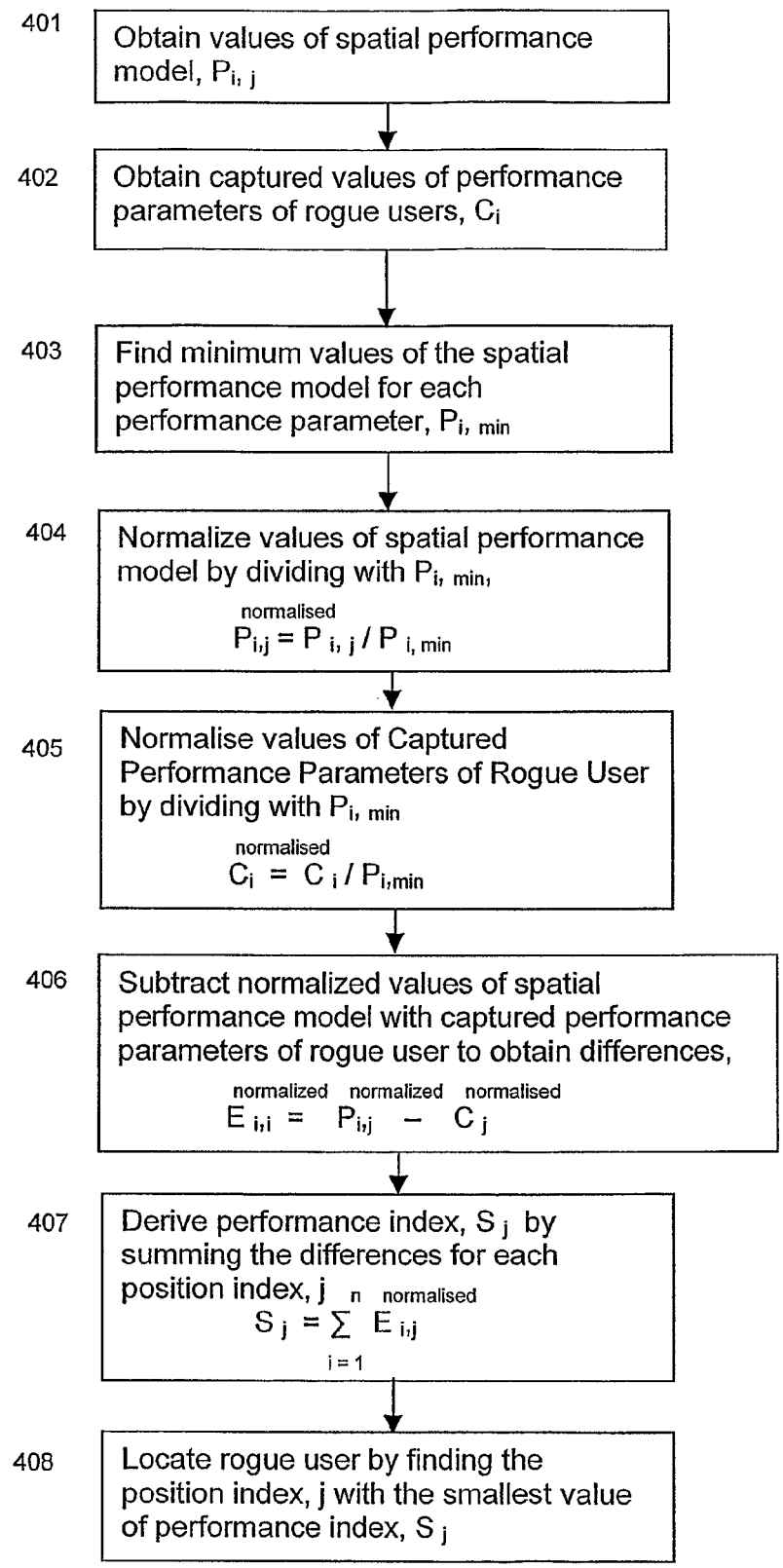
FIG. 4 is a more detailed flowchart showing how the algorithm of the present invention works in another embodiment of the invention.

Thus, a unique map of the area of coverage by the WLAN may be plotted using at least one performance parameter or characteristic. The model may also be presented with the performance characteristics represented as a derived index value. Of course, the more parameters measured and represented, the better. This map is illustrative of the spatial performance model. The diagram below shows the various spots or islands around a wireless access point 200 identified by their respective position indices in the map sharing the same performance characteristics at a particular time period of the day (FIG. 2). It will be appreciated that this mapping of the islands or spots in the area covered may be dynamic and the mapping is updated as the performance characteristics of the islands or spots change.

This information may also be listed into a corresponding matrix table representing the spatial performance model (102, FIG. 1), an element of the present invention. The matrix table for the above diagram is:

|  | Principal Direction | | | | | | | | | | | |
| --- | --- | --- | --- | --- | --- | --- | --- | --- | --- | --- | --- | --- |
|  | North | | | South | | | East | | | West | | |
|  | Position Index, j | | | | | | | | | | | |
|  | 1 | 2 | 3 | 4 | 5 | 6 | 7 | 8 | 9 | 10 | 11 | 12 |
| Ping Response Time | 0.08 | 0.15 | 0.11 | 0.12 | 0.18 | 0.14 | 0.07 | 0.17 | 0.1 | 0.05 | 0.2 | 0.3 |
| Signal To Noise Ratio | 0.9 | 0.55 | 0.7 | 0.82 | 0.45 | 0.65 | 0.86 | 0.6 | 0.75 | 0.92 | 0.4 | 0.65 |

This table is logged and dynamically updated by the NMS periodically throughout the day, depending on the processor demands of the network and also on the possibility of the threat of rogue users. This periodic updating is performed as the performance characteristics vary with the number of users logging into the network. For example, the network characteristics may be optimal at the early hours of the morning and least optimal during the day when the network's wireless traffic is heaviest. These records are stored and averaged to obtain dynamic, moving averages for the performance characteristics of each spot or island at each time period of the day.

Under the present invention, the NMS may be readily configured to periodically collect MAC and IP addresses of users wirelessly connected to the system for identification of possible rogue users. The identification is done by comparing the collected MAC and IP addresses with a reference set of valid addresses of authorized users. Users with addresses not on this reference set are considered as potential rogue users 103.

The next step in the method of the present invention is to analyse and geographically locate these potential rogue users. This step has two parts. First, the subnet address and hence, the nearest wireless access point (AP), serving the rogue user is determined by performing a logical AND operation between the captured IP address and the subnet mask of the rogue user.

The second part is to refine and determine the geographical location of the rogue user with reference to this, the nearest AP. To do this, the performance characteristics of the potential rogue user are captured 104. Then a ranking algorithm, an element of the present invention, is used to compare the performance characteristics of the potential rogue user with the average of the historical reference performance characteristics pertinent to the time of day of detection 105.

The algorithm normalizes, ranks and yields a performance index, representing the performance characteristics of each island covered by the nearest AP, with that of the rogue user's. Appropriate actions may then be taken 106, 107.

This method of the present invention essentially locates geographically potential rogue users based on their performance characteristics which standout from the background of moving performance averages.

This setup of the method of the present invention may be implemented in a number of ways and two embodiments of mathematical operations are given to illustrate its application. In no way should the present invention be seen to be limited to these two examples as many other mathematical operations that achieve normalization and ranking of performance values to establish the closest fit may be used to implement this step of the method of the present invention.

The following example illustrates how the algorithm works by a first series of mathematical operations. The two performance parameters used, ping response time and signal to noise ratio, are only illustrative and do not limit the present invention.

Table 1 below shows the historical, average values, $P_{i,j}$ of the selected performance parameters of 12 islands around an access point for the time period in question 301.

TABLE 1

|  | Principal Direction | | | | | | | | | | | |
| --- | --- | --- | --- | --- | --- | --- | --- | --- | --- | --- | --- | --- |
|  | North | | | South | | | East | | | West | | |
|  | Position Index, j | | | | | | | | | | | |
|  | 1 | 2 | 3 | 4 | 5 | 6 | 7 | 8 | 9 | 10 | 11 | 12 |
| Ping Response Time, $P_{1,j}$ | 0.08 | 0.15 | 0.11 | 0.12 | 0.18 | 0.14 | 0.07 | 0.17 | 0.1 | 0.05 | 0.2 | 0.3 |
| Signal To Noise Ratio, $P_{2,j}$ | 0.9 | 0.55 | 0.7 | 0.82 | 0.45 | 0.65 | 0.86 | 0.6 | 0.75 | 0.92 | 0.4 | 0.65 |

And the values of the performance parameters of the rogue access user captured at time of day, $C_i$ 302 are:

| | |
|---|---|
| Ping Response Time, $C_1$ | 0.07 |
| Signal To Noise Ratio, $C_2$ | 0.88 |

Subtracting to obtain the differences $E_{i,j}$ for the values of each performance parameter, i at each position index, j 303 using the formula $$E_{i,j}=|C_i-P_{i,j}|,$$

(where $C_i$ is the captured performance parameters of rogue user at time of day, $P_{i,j}$ is the moving average of the performance parameters at each position index or island), we get Table 2 below.

TABLE 2

| | Principal Direction | | | | | | | | | | | |
|---|---|---|---|---|---|---|---|---|---|---|---|---|
| | North | | | South | | | East | | | West | | |
| | Position Index, j | | | | | | | | | | | |
| | 1 | 2 | 3 | 4 | 5 | 6 | 7 | 8 | 9 | 10 | 11 | 12 |
| $E_{1,j}$ | 0.01 | 0.08 | 0.04 | 0.05 | 0.11 | 0.07 | 0.01 | 0.1 | 0.03 | 0.02 | 0.13 | 0.23 |
| $E_{2,j}$ | 0.02 | 0.33 | 0.18 | 0.06 | 0.43 | 0.23 | 0.02 | 0.28 | 0.13 | 0.04 | 0.48 | 0.23 |

And the minimum values for each differences 304 are:

| | |
|---|---|
| $E_{1\,min}$ | 0.01 |
| $E_{2\,min}$ | 0.02 |

Normalizing the value of each differences to obtain the rank numbers, $R_{i,j}$ 305 using the formula $$R_{i,j}=E_{i,j}/(E_{i,j})_{min},$$

(where $E_{i,j}$ min is the minimum for each difference), we get the rank numbers $R_{i,j}$ in Table 3:

TABLE 3

| | Principal Direction | | | | | | | | | | | |
|---|---|---|---|---|---|---|---|---|---|---|---|---|
| | North | | | South | | | East | | | West | | |
| | Position Index, j | | | | | | | | | | | |
| | 1 | 2 | 3 | 4 | 5 | 6 | 7 | 8 | 9 | 10 | 11 | 12 |
| $R_{1,j}$ | 2 | 16 | 8 | 10 | 22 | 14 | 1 | 20 | 6 | 4 | 26 | 46 |
| $R_{2,j}$ | 1 | 16.5 | 9 | 3 | 21.3 | 11.5 | 1 | 14 | 6.5 | 2 | 24 | 11.5 |
| $S_j$ | 3 | 32.5 | 17 | 13 | 43.5 | 25.5 | 2 | 34 | 12.5 | 6 | 50 | 57.5 |

Summing up the columns for each position index to obtain S, the sum of rank number for each position index, j 306. Thus S is the derived performance index for each island as identified by their respective position indices. From the performance index S, we can obtain the island or spot with the lowest value, which is the most likely location of the rogue user 307, where $$S_j = \sum_{i=1}^{n} R_{i,j}$$

In this example, n=2, since two performance parameters were selected.

To practice the invention, other series of mathematical operations may also be used as is illustrated by the following second method example. The data in Table 1 401 is again used in this second example.

The values of the performance parameters are first normalized by dividing them with the smallest value for that parameter 403, 404. (From Table 1, the smallest value of the parameter of ping response time is 0.05, and for the signal to noise ratio parameter, it is 0.4.)

The normalized values are given in Table 4:

TABLE 4

| | Principal Direction | | | | | | | | | | | |
|---|---|---|---|---|---|---|---|---|---|---|---|---|
| | North | | | South | | | East | | | West | | |
| | Position Index, j | | | | | | | | | | | |
| | 1 | 2 | 3 | 4 | 5 | 6 | 7 | 8 | 9 | 10 | 11 | 12 |
| Ping Response Time, $P_{1,j}^{normalised}$ | 1.6 | 3 | 2.2 | 2.4 | 3.6 | 2.8 | 1.3 | 3.4 | 2 | 1 | 4 | 6 |
| Signal To Noise Ratio $P_{2,j}^{normalised}$ | 2.25 | 1.38 | 1.75 | 2.05 | 1.13 | 1.63 | 2.15 | 1.5 | 1.88 | 2.3 | 1 | 1.63 |

The captured performance parameters of rogue user, $C_i$ are then divided by the smallest value 403 to obtain normalized values 405 as tabulated below:

| | |
|---|---|
| Ping Response Time, $C_1^{normalised}$ | 1.4 |
| Signal To Noise Ratio, $C_2^{normalised}$ | 2.2 |

The differences are calculated for each spot or island 406 by subtracting the normalized captured performance parameter value of rogue user and the normalized values of spatial performance model and these are summed 407 to obtain the value of S, the performance index for each spot or island. The results are given in Table 5:

purposes. The measures taken after detection and determination of the rogue user's geographical location of course depend on the prevailing laws of the land.

Thereafter, the location and performance characteristics of the rogue user may be recorded and flagged for tracking. In addition, predetermined security measures such as denial of access, warnings and prosecution may be effected according the user's organizational security and computer usage policies.

A person skilled in the art will appreciate that the method of the present invention is to first map the areas covered by the various wireless access point of the computer network. Thereafter, the network performance characteristics of each location spot sharing substantially the same characteristics, are determined by aggregating various network performance parameters to obtain background values and to establish the spatial performance model of the present invention. As shown by the examples given, this aggregation may be obtained by a number of mathematical operations which all yield the same objective: to derive a performance index that reveals the most probable geographical location of the rogue user.

TABLE 5

| | Principal Direction | | | | | | | | | | | |
|---|---|---|---|---|---|---|---|---|---|---|---|---|
| | North | | | South | | | East | | | West | | |
| | Position Index, j | | | | | | | | | | | |
| | 1 | 2 | 3 | 4 | 5 | 6 | 7 | 8 | 9 | 10 | 11 | 12 |
| $E_{1,j}^{normalised}$ | 0.2 | 1.6 | 0.8 | 1 | 2.2 | 1.4 | 0.1 | 2 | 0.6 | 0.4 | 2.6 | 4.6 |
| $E_{2,j}^{normalized}$ | 0.05 | 0.83 | 0.45 | 0.15 | 1.08 | 0.58 | 0.05 | 0.7 | 0.33 | 0.1 | 1.2 | 0.58 |
| $S_j$ | 0.25 | 2.43 | 1.25 | 1.15 | 3.28 | 1.98 | 0.15 | 2.7 | 0.93 | 0.5 | 3.8 | 5.18 |

By this second method example, the most probable location of the rogue user is given by the island or spot with the smallest performance index (S value) 408, which, in this case is location number (or position index) 7.

Thus, no matter the number of possible mathematical methods used for deriving the performance indices of the islands and that for rogue users, the same or substantially the same method is used to for both the islands and for the rogue users.

Upon determining the location by the methods of the present invention, immediate arrival at the spot or island by the network administration or law enforcement staff may allow photographic evidence of the intrusion as well as the likeness of the rogue user to be captured for identification In the techniques of the prior art, any rogue user accessing the network may be identified by his MAC and IP addresses. However, the spatial performance model of the present invention may then be used to locate him by matching the performance characteristics of his computer with that of the island or spot with the same or substantially the same performance characteristics.

The person skilled in the art will also recognise that the algorithm of the present invention may be readily represented by various equivalent mathematical operations and implemented in a variety of programming languages or routines, to be linked to the NMS so that the present invention may be implemented and practiced.

Thus, to enable the invention to be practiced, a person skilled in the art will appreciate the minimum physical embodiment of the present invention consists of a computer network with at least one wireless access point, at least one processor, at least a network management system, at least one storage means and at least one implementation of the algorithm of the present invention. By implementing the algorithm of the present system in such a computer network, rogue users may be located without having any of the network's staff having to be physically in the vicinity of the rogue user to locate him, unlike the limitations of the prior art. Other variations and embodiments of the present invention will be under the present invention.

The present invention therefore provides a method, an algorithm and a system for detecting and geographically locating rogue access users to a wireless computer network that overcomes, or at least alleviates, the limitations of the prior art.

It will be appreciated that although one preferred embodiment has been described in detail, various modifications and improvements can be made by a person skilled in the art without departing from the scope of the present invention.

The invention claimed is:

1. A method for detecting and geographically locating a rogue user accessing a wireless computer network wirelessly, where the wireless computer network comprises a server computer system and a plurality of wireless access points via which a wireless computer workstation accesses the server computer system, the method comprising:
    deploying a Network Management System (NMS) into the server computer system for collecting Media Access Control (MAC), Internet Protocol (IP) addresses of computer workstations and access points connected onto the network, and the performance characteristics of the computer workstations and access points;
    detecting a rogue user by comparing the collected MAC and IP addresses with a reference set of valid addresses of authorized users, wherein a user with addresses not on the reference set is considered as the rogue user;
    determining the nearest wireless access point serving the rogue user by performing a logical AND operation between the collected IP address and the subnet mask of the rogue user;
    determining the geographical location of the rogue user with reference to the nearest wireless access point by a ranking algorithm that derives at least one performance index for the rogue user from the collected performance characteristics of the rogue user and compares the performance index of the rogue user with the average of the reference performance indices of each island mapped near the nearest access point in a spatial performance model pertinent to the time of day of detection;
    wherein the spatial performance model having a plurality of islands is constructed dynamically by the following operations, comprising:
        collecting and mapping out the performance characteristics of wireless computer workstations in the plurality of islands in the area covered by the wireless access points of the network;
        measuring at least one network performance parameter of the performance characteristics for each island, wherein each island shares the same performance characteristics; and
        deriving a performance index for each island based on the at least one performance parameter to obtain the spatial performance model; and
    alerting the administer of the network for taking security measures against the located rogue user.

2. The method according to claim 1, wherein deriving the performance index of the rogue user and each island, comprising:
    obtaining differences between the collected performance parameters of the rogue user and the performance parameters in the spatial performance model;
    determining a minimum value for each difference;
    normalizing the acquired performance parameters for each difference to obtain a rank number; and
    summing the rank number for each island to obtain the performance index.

3. The method according to claim 1, wherein deriving the performance index of the rogue user and each island, comprising
    determining a minimum values of each performance parameter in the spatial performance model;
    normalizing the values of each performance parameter in the spatial performance model and the collected performance parameters of the rogue user to obtain the rank numbers;
    obtaining the differences between the rank numbers of performance parameters in the spatial performance model and the collected performance parameters of the rogue user; and
    summing the differences for each island to obtain the performance index.

4. The method according to claim 1, wherein deriving of the at least one performance index comprising dynamically re-mapping the islands previously mapped based on a current performance index of each island at time intervals.

5. The method according to claim 1, wherein the performance parameters include variables defined at any of a physical layer, a network layer, an application layer and a data link layer.

6. The method according to claim 5, wherein the physical layer includes any or all of signal strength, noise power and signal-to-noise ratio.

7. The method according to claim 5, wherein the network layer includes any or all of ping response time, packet round-trip time, packet loss rate and propagation delay times.

8. The method according to claim 5, wherein the application layer includes any or all of transactions responses, applications responses and end-to-end delay times.

9. The method according to claim 5, wherein the data link layer includes any or all of link utilization, frame loss rate, number of error frames and throughput rate.

10. The method according to claim 5, wherein the performance parameters include any of distance from access point, number of wireless users, network topology, building material used and time of day.

11. A wireless computer network being capable of detecting and geographically locating a rogue user accessing the wireless computer network, comprising:
    a server computer system with a non-transitory computer readable medium; and
    a plurality of wireless access points via which wireless computer workstations access the server computer system;
    wherein the non-transitory computer readable medium is embedded with computer executable programs including:

a Network Management System (NMS) program for collecting Media Access Control (MAC), Internet Protocol (IP) addresses of computer workstations and access points connected onto the network, and the performance characteristics of the computer workstations and access points;

a program for detecting a rogue user by comparing the collected MAC and IP addresses with a reference set of valid addresses of authorized users, wherein a user with addresses not on the reference set is considered as the rogue user;

a program for determining the nearest wireless access point serving the rogue user by performing a logical AND operation between the collected IP address and the subnet mask of the rogue user;

a program for determining the geographical location of the rogue user with reference to the nearest wireless access point by a ranking algorithm that derives at least one performance index for the rogue user from the collected performance characteristics of the rogue user and compares the performance index of the rogue user with the average of the reference performance indices of each island mapped near the nearest access point in a spatial performance model pertinent to the time of day of detection;

wherein the spatial performance model having a plurality of islands is constructed dynamically by a program comprising:

collecting and mapping out the performance characteristics of wireless computer workstations in the plurality of islands in the area covered by the wireless access points of the network;

measuring at least one network performance parameter of the performance characteristics for each island, wherein each island shares the same performance characteristics; and deriving a performance index for each island based on the at least one performance parameter to obtain the spatial performance model; and a program for alerting the administer of the network for taking security measures against the located rogue user.

12. The network according to claim 11, wherein the performance index of the rogue user and each island, comprising:

obtaining differences between the collected performance parameters of the rogue user and the performance parameters in the spatial performance model;

determining a minimum value for each difference;

normalizing the acquired performance parameters for each difference to obtain a rank number; and summing the rank number for each island to obtain the performance index.

13. The network according to claim 11, wherein the performance index of the rogue user and each island, comprising determining a minimum values of each performance parameter in the spatial performance model;

normalizing the values of each performance parameter in the spatial performance model and the collected performance parameters of the rogue user to obtain the rank numbers;

obtaining the differences between the rank numbers of performance parameters in the spatial performance model and the collected performance parameters of the rogue user; and summing the differences for each island to obtain the performance index.

14. The network according to claim 11, wherein the islands previously mapped are dynamically re-mapped based on a current performance index of each island at time intervals.

15. The network according to claim 11, wherein the performance parameters includes variables defined at any of a physical layer, a network layer, an application layer and a data link layer.

16. The network according to claim 11, wherein the physical layer includes any or all of signal strength, noise power and signal-to-noise ratio.

17. The network according to claim 15, wherein the network layer includes any or all of ping response time, packet round-trip time, packet loss rate and propagation delay times.

18. The network according to claim 15, wherein the application layer includes transactions responses, applications responses and end-to-end delay times.

19. The network according to claim 15, wherein the data link layer includes any of link utilization, frame loss rate, number of error frames and throughput rate.

20. The network according to claim 11, wherein the spatial performance model differs at a particular period of the day.

21. The network according to claim 11, wherein the performance parameters include any of distance from access point, number of wireless users, network topology, building material used and time of day.

* * * * *

UNITED STATES PATENT AND TRADEMARK OFFICE
CERTIFICATE OF CORRECTION

PATENT NO.        : 7,810,154 B2
APPLICATION NO.   : 10/564738
DATED             : October 5, 2010
INVENTOR(S)       : Gau Wei Hum et al.

Page 1 of 1

It is certified that error appears in the above-identified patent and that said Letters Patent is hereby corrected as shown below:

Column 12, line 52, delete "claim 5" and replace with "claim 1"

Signed and Sealed this
Fourth Day of January, 2011

David J. Kappos
*Director of the United States Patent and Trademark Office*